No. 875,719. PATENTED JAN. 7, 1908.
F. MAWHINNEY.
BOUQUET HOLDER.
APPLICATION FILED AUG. 5, 1907.
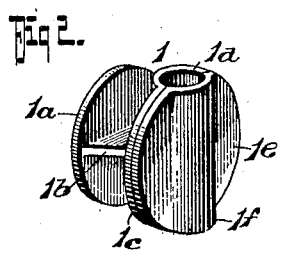
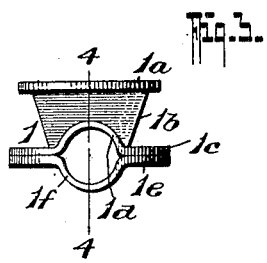
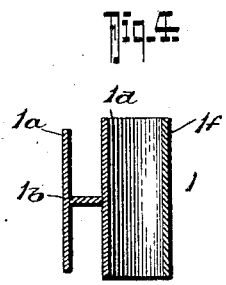
WITNESSES:
John T. Schrott
H. Woodard
INVENTOR
Frank Mawhinney,
BY
Fred G. Dieterich
ATTORNEYS

UNITED STATES PATENT OFFICE.

FRANK MAWHINNEY, OF TOPEKA, KANSAS.

BOUQUET-HOLDER.

No. 875,719.  Specification of Letters Patent.  Patented Jan. 7, 1908.

Application filed August 5, 1907. Serial No. 387,185.

*To all whom it may concern:*

Be it known that I, FRANK MAWHINNEY, residing at Topeka, in the county of Shawnee and State of Kansas, have invented certain new and useful Improvements in Bouquet-Holders, of which the following is a specification.

My invention relates to certain new and useful improvements in bouquet holders, and it particularly seeks to provide a device of this character of a simple and effective construction which can be easily and cheaply manufactured and which can be readily worn in the button-hole of an ordinary coat lapel.

In its generic nature, the invention embodies a holder comprising a flat shank, a disk carried at one end thereof, and a "button-head" having a tubular portion carried at the other end of the shank and adapted to receive the stems of the flowers.

In its more subordinate features, my invention comprises certain novel details of construction, combination and arrangement of parts, all of which will be first described in detail, and then be specifically pointed out in the appended claims, reference being had to the accompanying drawings, in which, Figure 1, is a perspective view showing my invention applied for use. Fig. 2, is a perspective view of my invention. Fig. 3, is a top plan view thereof. Fig. 4, is a central, vertical section on the line 4—4 of Fig. 3.

Referring now to the accompanying drawings in which like letters and numerals of reference, indicate like parts in all of the figures, 1 designates my invention which consists of the disk 1ª to which the flat shank 1ᵇ is formed, either integrally or by welding the two parts together or attaching them in any other suitable manner. The front end of the shank 1ᵇ is curved in plan view to receive the rear plate 1ᶜ of the "button-head" which plate 1ᶜ includes the tubular semi-circular portion 1ᵈ which is securely welded or otherwise fastened to the shank 1ᵇ, as shown.

1ᵉ designates the front plate of the "button-head" which is of similar form to the rear plate 1ᶜ and has a tubular portion 1ᶠ to coöperate with the tubular portion 1ᵈ to form a cylindrical stem receiving pocket in which the stems of the flowers 2 are placed.

The two sections of the "button-head" may be securely welded or otherwise fastened together to form an integral structure.

In the practical application of my invention, the holder is inserted in the button-hole of the coat lapel, as shown in Fig. 1, and the stems of the flowers inserted into the tubular portion of the "button-head".

From the foregoing taken in connection with the accompanying drawings, it is thought the complete construction, operation and numerous advantages of my invention will be readily understood by those skilled in the art to which my invention appertains.

What I claim is,—

1. A bouquet holder comprising a shank, a disk member secured at one end of the shank, a "button-head" secured to the other end of the shank, said "button-head" having a tubular portion, and said shank having a curved socket to receive said tubular portion, substantially as shown and described.

2. A bouquet holder comprising a shank, a disk member secured at one end of the shank, a "button-head" secured to the other end of the shank, said "button-head" having a tubular portion, and said shank having a curved socket to receive said tubular portion, said "button-head" comprising two sections of like form, substantially as shown and described.

3. A bouquet holder comprising a shank, a disk member secured at one end of the shank, a "button-head" secured to the other end of the shank, said "button-head" having a tubular portion, and said shank having a curved socket to receive said tubular portion, said "button-head" comprising two sections of like form, and means for securing said sections together to form rigid structure, substantially as shown and described.

FRANK MAWHINNEY.

Witnesses:
 FRED S. BROWN,
 BYRON D. VAN OSTRAND.